(12) United States Patent
Chan et al.

(10) Patent No.: US 6,263,194 B1
(45) Date of Patent: Jul. 17, 2001

(54) TRANSMITTER CUT OFF APPARATUS

(75) Inventors: Edmond Chan; Vincent Lam, both of Shatin (HK)

(73) Assignee: RadioShack Corporation, Fort Worth, TX (US)

( * ) Notice: Subject to any disclaimer, the term of this patent is extended or adjusted under 35 U.S.C. 154(b) by 0 days.

(21) Appl. No.: 09/118,506

(22) Filed: Jul. 17, 1998

(51) Int. Cl.[7] ....................................................... H04B 1/04

(52) U.S. Cl. ........................... 455/115; 455/116; 455/127; 455/117; 340/588; 340/589

(58) Field of Search ..................................... 455/115, 118, 455/119, 116, 127; 331/176, 68; 340/588, 589, 870.16, 870.17, 870.3; 330/296

(56) References Cited

U.S. PATENT DOCUMENTS 5,982,824 * 11/1999 Ann ........................................ 375/345

* cited by examiner

Primary Examiner—Daniel Hunter
Assistant Examiner—Alan T. Gantt
(74) Attorney, Agent, or Firm—William A. Linnell

(57) ABSTRACT

An apparatus and method to use the temperature of a transmitting radio to prevent transmission of radio waves outside of an assigned frequency band. More specifically, if a transmitter exceeds a specified temperature the transmitter will be automatically disabled to prevent temperature caused frequency shifts outside the approved frequency transmission band for the transmitter. The transmitter has a temperature sensor that senses temperature and compare the operating temperature against a preselected temperature limit. It the operating temperature either is too hot or too cold the transmitter will be disabled and will not transmit until the temperature falls or rises to an acceptable level.

17 Claims, 4 Drawing Sheets

TRANSMITTER CUT OFF APPARATUS

FIELD OF THE INVENTION

This invention relates to an apparatus and method to use the temperature of a transmitting radio to prevent transmission of radio waves outside of an assigned frequency band. More specifically, if a crystal oscillator transmitter exceeds a specified temperature, the transmitter will be automatically disabled to prevent temperature caused frequency shifts outside the approved transmission band for the transmitter.

BACKGROUND OF THE INVENTION

The present invention relates to a radio circuit having particular, but not exclusive, application in transportable radio communications equipment. There is a need for stable oscillator circuits to operate over a temperature range of −30 degrees C. to +70 degrees C.

A vibrating crystal has a resonating frequency at which the crystal exhibits minimum impedance. This resonating frequency varies with crystal temperature. A "stable" crystal is one in which the crystals resonating frequency is relatively constant throughout the temperature range of operation. The amount of temperature caused variance is also dependent on crystal age and environmental factors such as vibration. The higher the quality of the crystal the more stable the frequency response over a range of temperatures. In order to achieve proper frequency response, the crystal itself must be of superior quality and the temperature of the crystal must be maintained at an acceptable level.

FIG. 2 shows the drift, $\Delta f/f$, in the frequency of the crystal, expressed in parts per million, with temperature, T. in degrees Celsius. In order to be able to halt such drift it is necessary to keep the temperature of the crystal constant. The equation representing this is:

$$\Delta f/f = k_a(T-T_o) + k_b(T-T_o)^3$$

where f is the frequency of oscillation, T is the temperature of the crystal and $k_a$, $k_b$ and $T_o$ are constants which must be individually determined for each crystal and depend, in particular, on the cut of the crystal. The frequency shift is also affected by crystal aging combined with temperature changes. The following holds true for the frequency response of aging:

$$\Delta f/f = k_c e^{-k_d/T} \ln t$$

where $k_c$ and $k_d$ are constants which must be individually determined for each oscillator. Thus the age of the crystal will affect the crystal's temperature response. In order to ensure homogenous response, crystals of the same type must be cured prior to use. Even though the crystal is cured the resonant frequency at a given temperature will change to a greater or lesser degree making precise compensation difficult as the required compensation temperature will vary with the age of the crystal.

The prior art contains many devices to compensate for temperature variations in radio crystals. In some cases variable pressure was applied to an axis of the crystal to stabilize the oscillating frequency during variations in temperature. Other prior art incorporates a heater inside the crystal housing, or crystal can, such as that disclosed in U.S. Pat. No. 3,818,254. One disadvantage in using a heater is the large power required to heat the crystal. Also, heater units add to the cost of the transmitter. U.S. Pat. No. 4,949,055 discloses a crystal temperature compensation circuit requiring a temperature sensor, an analog to digital converter and a microprocessor. U.S. Pat. No. 5,471,173 discloses a cascaded amplifier using current proportional to the absolute temperature. As is shown by the prior art, attempts to compensate for temperature drifting requires additional power consumption and additional circuitry, adding to the manufacturing cost of the transmitter. The present invention eliminates the need to cure or heat crystals to prevent unacceptable frequency drift due to temperature changes in the oscillating crystal.

SUMMARY OF THE INVENTION

An object of this invention is a method of controlling the output of a transmitter by: selecting at least one predetermined temperature limit and generating at least one temperature limit signal representing the predetermined temperature limit; measuring the temperature of a transmitter and generating a measured temperature signal; comparing the measured temperature signal with at least one temperature limit signal to determine if the measurement of the temperature of the transmitter is either greater than or less than at least one of the temperature limits; and interrupting the output of the transmitter if the measured temperature is either greater than or less than at least one temperature limit.

It is a further object of this invention that the measured temperature signal is compared either with a temperature limit signal representing an upper temperature limit to determine if the measured temperature is greater than the upper temperature limit or a temperature limit signal representing a lower temperature limit to determine if the measured temperature is lower than the lower limit or both. It is a further object of this invention to halt output of the transmitter by interrupting the transmitter's power supply. It is a further object of this invention to compare the measured temperature signal with at least one temperature limit signal in a computing device.

It is a further object of this invention to teach an apparatus for controlling the output of a transmitter having: a temperature sensor producing a signal proportional to the temperature of the transmitter; a signal generator for producing a reference signal representative of at least one predetermined temperature limit; a comparison device to determine if the measurement of the temperature of the transmitter is either greater than or less than the reference signal; and a cutoff signal generator to send a cutoff signal if the measurement of the temperature of the transmitter is greater than or less than at least one of the predetermined reference signals.

It is a further object of this invention to either compare the measured temperature signal with an upper reference signal to determine if the measured temperature is greater than the temperature limit or with a lower reference signal to determine if the measured temperature is less than the predetermined lower temperature limit or both and halting the output of a transmitter if the measured temperature is either greater than or less than at least one predetermined value by interrupting the transmitter's power supply. It is a further object of this invention that the comparison device is a microprocessor which transmits a signal to a switch to receive the cutoff signal and halt the output of the transmitter if the measured temperature exceeds either an upper or lower limit.

Another object of this invention is to provide an apparatus to measure the ambient temperature and to prevent transmission by the transmitter if the ambient temperature exceeds a predetermined temperature range.

Various other purposes and advantages of the invention will become clear from its description in the specification that follows. It will be understood that the invention is not limited to the precise embodiment disclosed below and that alternative embodiments and methods will be readily apparent to those skilled in the art without departing from the spirit and scope of the invention as defined in the claims.

DESCRIPTION OF THE PREFERRED EMBODIMENT

A crystal oscillator transmitter has an oscillator crystal excited by a piezoelectric oscillator circuit in the usual fashion. The crystal temperature is measured by a temperature sensor which retransmits a temperature signal to a comparator which compares the measured temperature to one or more pre-selected values. The comparison can be against a minimum value, a maximum value or both to determine if the measured temperature falls above or below a specified range. If the comparison reveals the measured temperature exceeds the pre-selected parameters, a power relay is opened by a microprocessor deactivating the transmitter. Such a crystal oscillator cutoff circuit is much less costly and requires far less space than a compensation circuit which calls for thermostats adjusted with a very high degree of precision. Described below is a preferred embodiment to perform the present invention, but any suitable temperature sensing device and signal comparison means with memory, all well known to those skilled in the art, can be substituted for the components described below.

Figure 1:
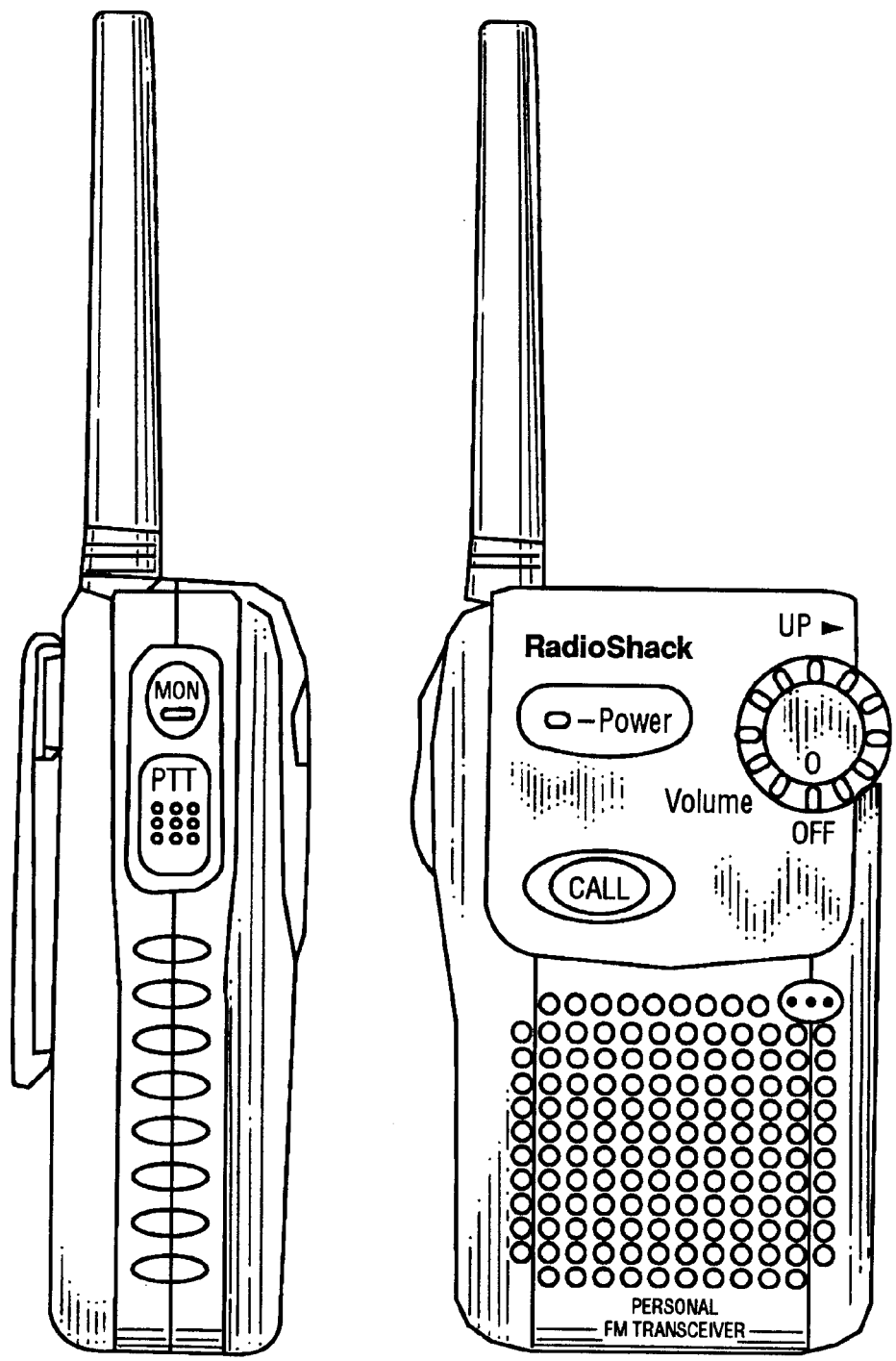
FIG. 1 depicts a portable radio incorporating the present invention.
Figure 2:
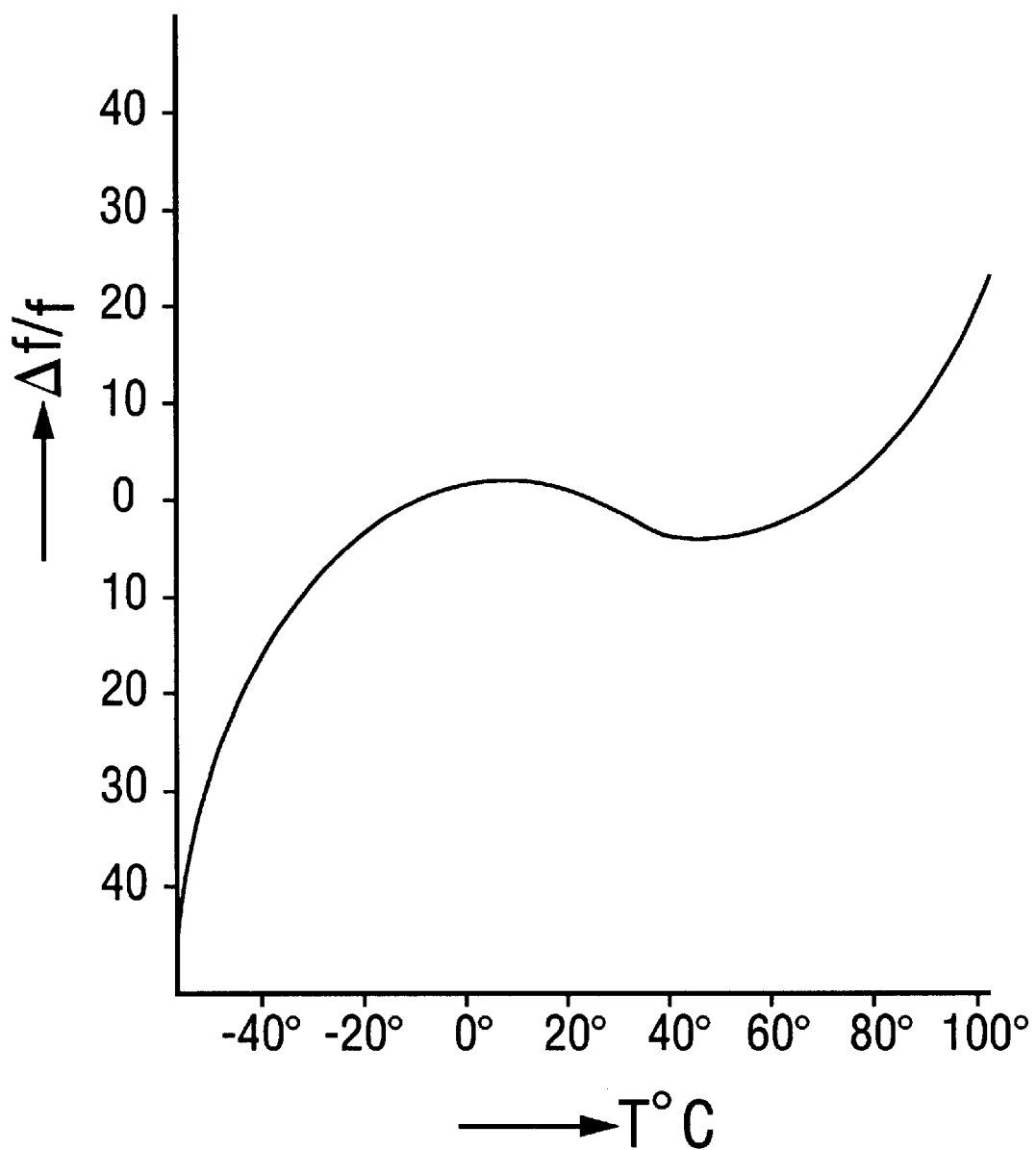
FIG. 2 is a diagram depicting the temperature dependent frequency response of an oscillator crystal.
Figure 3:
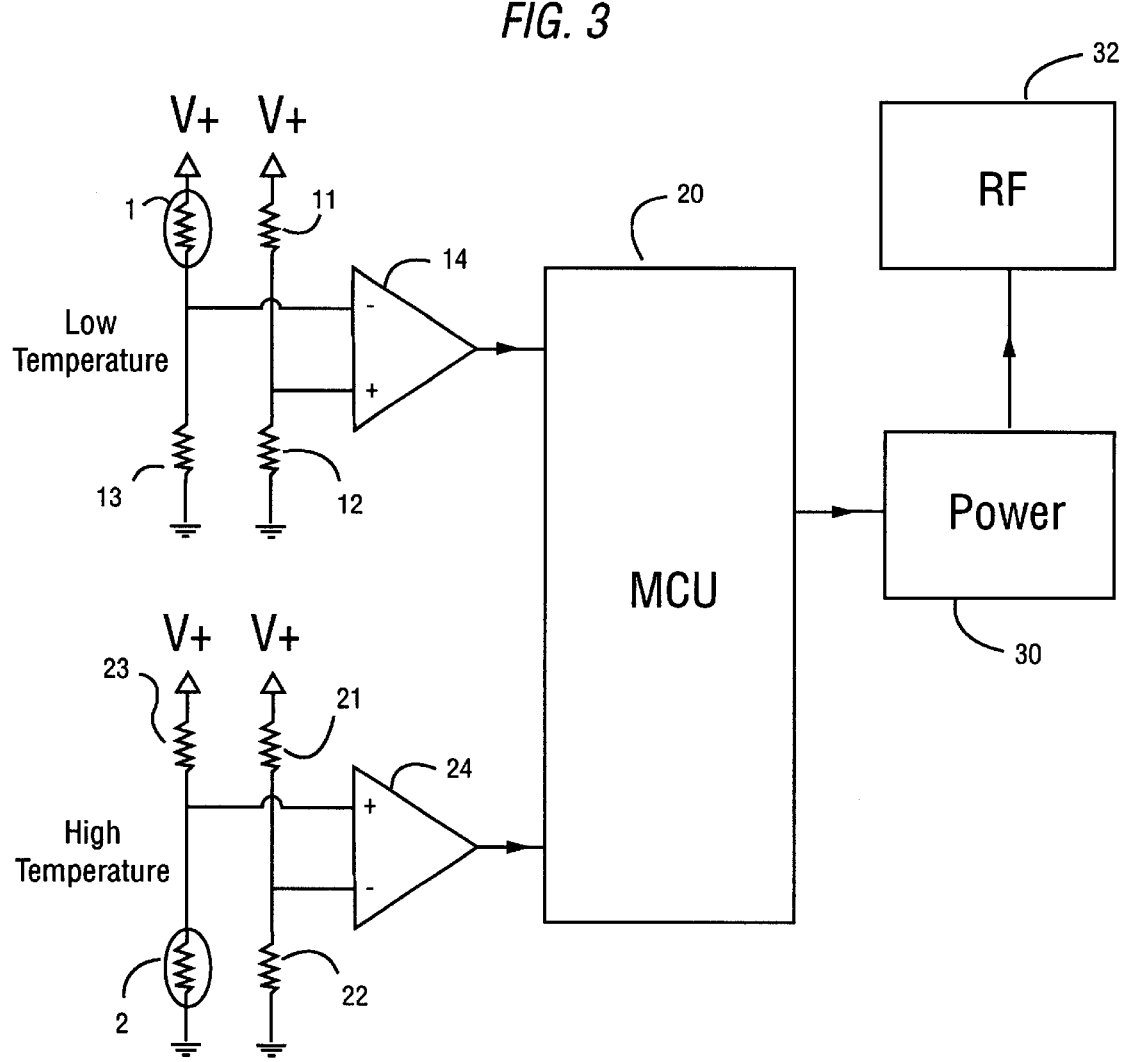
FIG. 3 is a block diagram of the present invention.

The frequency of an oscillator is stabilized by the crystal and the operation of this type of crystal oscillator transmitter is well known and therefore will not be described in detail. FIG. 3 is a block diagram depicting a device to perform the present invention. The temperature of the transmitter is detected by using a comparator having thermistors 1 and 2. Both thermistors have the monotonous characteristic of increasing resistance as a function of decreasing temperature. If the temperature is beyond the designed limits, the power to the RF oscillator 32 will be interrupted by the Microprocessor Control Unit (MCU) 20.

For the low temperature system, the resistance ratio of resistors 11 and 12 controls the reference voltage of the upper comparator 14. Also, the resistance ratio of thermistor 1 and resistor 13 controls the designated low temperature cut off voltage. If the temperature is decreased, the thermistor resistance will be increased. Hence the voltage at the non-inverting input of the upper comparator 14 will be decreased. Once the non-inverting terminal voltage drops below the lower limit, i.e. the environmental temperature is lower than the designated level, the designated will change the output logic level from low to high. And the MCU would interrupt the RF oscillator power 30 accordingly.

For the high temperature system, the circuitry employs the same concept as low temperature. The resistance ratio of resistor 21 and resistor 22 will control the reference voltage. The resistance ratio of thermistor 2 and resistor 23 controls the designated cut off temperature. Once the temperature is increased beyond the upper limit, the thermistor resistance will be decreased. Hence the voltage level of non-inverting input of the second comparator 24 will be lower than the reference value. The output level of the comparator 24 will change from high to low. Hence the MCU 20 will know the existing temperature is higher than the limit and will cut off the RF power 30.

The operator is advised either through visual cues, aural tones, or similar means that transmission is no longer possible. For example a LED on the transmitter can illuminate when power has been removed by the MCU 20. In another preferred embodiment the ability of the MCU 20 to remove power from the RF transmitter 32 can be disabled or overridden in emergency conditions by either entering a code or pressing a switch or similar means.

Figure 4:
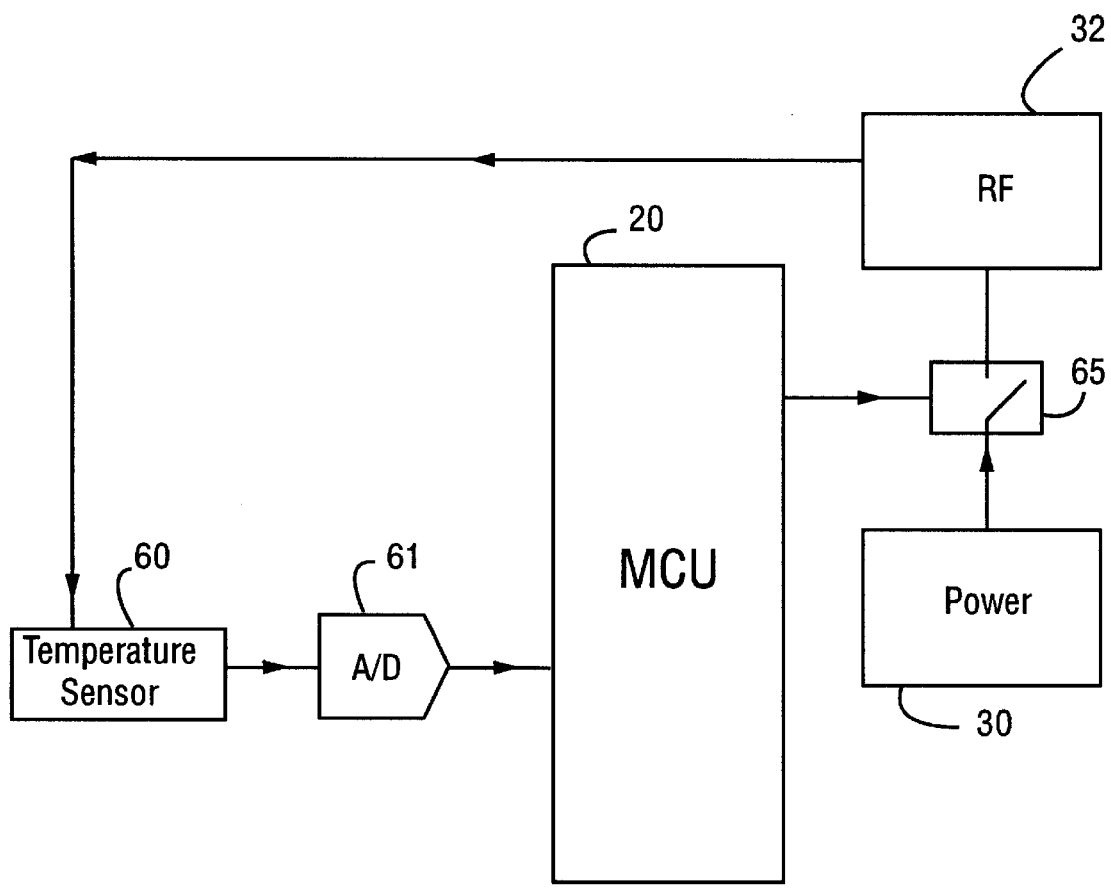
FIG. 4 is a block diagram of an alternate embodiment of the present invention.

FIG. 4 depicts another preferred embodiment of the present invention. An analog temperature sensor 60 receives an input from the RF transmitter 32. The temperature sensor 60 transmits a signal to an analog to digital converter 61 which transforms the analog signal into a digital signal. The digital signal is received by the MCU 20 where it is compared against one or more predetermined values to determine if the measured temperature exceeds the predetermined limits. If the limits are exceeded, the MCU 20 sends a signal to switch 65 interrupting power from the RF power source 30 to the RF transmitter 32.

Other modifications would be readily apparent to one skilled in the art that would not deviate from the novelty of the present invention.

We claim:

1. A method of controlling the output of a transmitter comprising the steps of:
    selecting at least one predetermined temperature limit;
    measuring the temperature of said transmitter;
    comparing said measured temperature with said at least one temperature limit to determine if said measurement of said temperature of said transmitter is either greater than or less than one of said temperature limits; and
    halting the output of said transmitter by interrupting said transmitter's power supply if said measured temperature is beyond said at least one temperature limit.

2. The method of claim 1 further comprising:
    wherein said measured temperature signal is compared with a temperature limit representing an upper temperature limit to determine if said measured temperature is greater than said upper temperature limit.

3. The method of claim 1 further comprising:
    wherein said measured temperature is compared with a temperature limit signal representing a lower temperature limit to determine if said measured temperature is lower than said lower limit.

4. The method of claim 1 further comprising the steps of:
    wherein said comparing said measured temperature with at least one temperature limit signal occurs in a microprocessor.

5. A method of claim 1 further comprising the steps of:
    wherein said measured temperature signal is compared with an upper temperature limit to determine if said measured temperature is greater than said upper temperature limit;
    wherein said measured temperature is compared with a lower temperature limit to determine if said measured temperature is lower than said lower limit;
    wherein said comparing said measured temperature with said upper temperature limit and said lower temperature limit occurs in a microprocessor; and halting said output of said transmitter by interrupting said transmitter's power.

6. An apparatus of controlling the output of a transmitter comprising:
   a temperature sensor, said temperature sensor producing a signal proportional to the temperature of said transmitter;
   a comparison device having at least one input reference temperature wherein said comparison device compares the temperature of said transmitter with said reference temperature; and
   a cutoff signal generator to send a cutoff signal to interrupt said transmitter's power if said measurement of said temperature of said transmitter is beyond said reference temperature.

7. The apparatus of claim 6 further comprising:
   wherein said measured temperature is compared with a reference signal proportional to an upper temperature limit to determine if said measured temperature is greater than said temperature limit.

8. The apparatus of claim 6 further comprising:
   wherein said measured temperature is compared with a lower reference signal proportional to a lower temperature limit to determine if said measured temperature is less than said predetermined lower temperature limit.

9. The apparatus of claim 6 further comprising:
   wherein said comparison device is a microprocessor.

10. The apparatus of claim 6 further comprising:
    a switch to receive said cutoff signal and halt the output of said transmitter.

11. An apparatus for controlling the output of a transmitter comprising:
    a means for sensing temperature, said means for sensing temperature producing a signal proportional to the temperature of said transmitter;
    a means for comparison, said means for comparison having at least one predetermined reference temperature, wherein said means for comparison determines if said measurement of said temperature of said transmitter is either greater than or less than said at least one predetermined reference temperature;
    a generating means to generate a cutoff signal when said measurement of said temperature is beyond the predetermined reference temperature; and
    a means to halt said output of said transmitter by interrupting said transmitter's power supply when said cutoff signal is generated.

12. The apparatus of claim 11 further comprising:
    wherein said measured temperature is compared with an upper reference temperature to determine if said measured temperature is greater than said upper reference temperature.

13. The apparatus of claim 11 further comprising:
    wherein said measured temperature is compared with a lower reference temperature to determine if said measured temperature is less than said predetermined lower temperature.

14. The apparatus of claim 11 further comprising:
    wherein said comparison means is a means for executing computer program instructions.

15. The apparatus of claim 11 further comprising:
    a cutoff means to receive said cutoff signal and halt the output of said transmitter.

16. The apparatus of claim 11 further comprising:
    a operator alert means to notify said transmitter operator that transmission has been halted.

17. The apparatus of claim 15 further comprising:
    an override means to disable said cutoff means and restore power to said transmitter.

* * * * *